Aug. 7, 1951     J. E. McCOMBIE     2,563,350

PHONOGRAPH RECORD INDEXING DEVICE

Filed Nov. 22, 1946

Inventor
JOHN E. McCOMBIE

Patented Aug. 7, 1951

2,563,350

UNITED STATES PATENT OFFICE 2,563,350

PHONOGRAPH RECORD INDEXING DEVICE

John E. McCombie, Waterloo, Iowa

Application November 22, 1946, Serial No. 711,661

6 Claims. (Cl. 40—10)

My invention relates to indexing devices, and more particularly to devices for indexing phonograph records.

The object of my invention is to provide an indexing device adapted to be removably attached to a phonograph record so that it can be easily seen and read without removing the record from the rack on which, or from the envelope, in which, it is stored.

Other objects of my invention not specifically mentioned may appear in the following specification describing my invention with reference to the accompanying drawings illustrating preferred embodiments of my invention.

It is, however, to be understood that my invention is not to be limited or restricted to the exact constructions and combination of parts described in the specification and shown in the drawings, but that such changes and modifications can be made which fall within the scope of the claims appended hereto.

Figure 1:
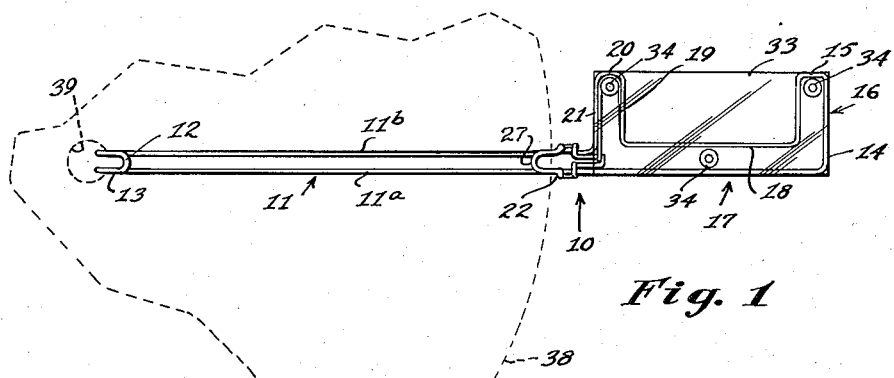
Figure 1 is a top plan view of an indexing device according to my invention attached to a phonograph record fragmentarily shown in broken lines.

Referring now in detail to the drawings, and especially to the Figures 1, 2, 3 and 4, the indexing device forming the subject matter of my invention has a wire arm or frame 10 preferably made from one continuous piece of wire. This frame 10 comprises a straight shank 11 consisting of two wire bars 11a and 11b extending parallel to each other and connected together at their front ends by a curved wire portion 12, which is bent downwardly to extend parallel to the shank 11 and to form a hook 13.

The wire bar 11a extends rearwardly beyond the other wire bar 11b and is then bent laterally at right angles, as at 14, and extends then forwardly for a short distance, as shown at 15. The wire then extends inwardly parallel to the portion 14 to form therewith the rear arm 16 of a window frame 17, and then forwardly parallel to the wire bar 11a forming the longitudinal member 18 of said window frame. Then the wire is bent laterally, as at 19, forwardly, as at 20, and then parallel to wire portion 19, as at 21. This wire portion 21 is connected with the shank bar 11b by welding or the like.

A wire latch slide 22 is formed so that it has a rearwardly extending member 23 on the forward end of which a half-loop 24 is formed. From this half-loop 24 a wire portion 25 extends forwardly and ends in a second half-loop 26. A downwardly bent arcuately closed front portion 27 extends forwardly from this second half-loop 26 and on its end a third half-loop 28 is formed which is connected by a rearwardly extending straight wire portion 29 with a fourth half-loop 30. From the last-mentioned half-loop the wire extends straight rearwardly, as shown at 31, and is then bent laterally to form the rear portion 32 of the slide 22. The half-loops 24 and 30, and 26 and 28, are arranged oppositely to each other so that they are adapted to partially encircle the shank bars 11a and 11b and slide thereon toward and away from the hook 13.

Two window panes 33 are secured to the window frame 17 by means of hollow rivets 34 arranged between the window frame portions 11a and 18, the member of the window frame rear arm 16 and the wire portions 19 and 21. The window panes are preferably made from a diaphanous plastic material, such as Plexiglas or the like.

A U-shaped spring 35 is arranged between the two window panes 33 so that it surrounds the rivet 34 located between the wire portions 19 and 21. The rear leg 36 of the U-shaped spring 35 engages the wire portion 19 and the end of the front leg 37 of the spring engages the rear end of the wire portion 23 of the slide 22, urging said slide forwardly. The lower end of the front leg 37 is located between the free end of the wire portion 23 of the slide and the rear portion 32 thereof, which portions 23 and 32 cooperate to provide a detent. The expansion of the spring 35 is limited by the wire portion 21 which is engaged by the front leg 37 of the spring. In this manner the forward movement of the slide 22 is limited.

A card (not shown) bearing name and number of a phonograph record 38 may be inserted between the two window panes 33 and then the indexing device can be loosened and removably attached to the corresponding record by moving the latch slide 22 rearwardly against the pressure of the spring 35, inserting the hook in the center hole 39 of the record 38 and permitting the latch slide to move forwardly under the pressure of the spring to overlie the edge of the record.

The front latch finger portion of the latch slide 22 is then located above or below the record 38 securing the indexing device on the record, but permitting rotary movement of the device on the record, because the forward movement of the slide 22 is limited so that the two front half-loops 26 and 28 do not engage the circumferential edge of the record.

Figures 2, 3, 5:
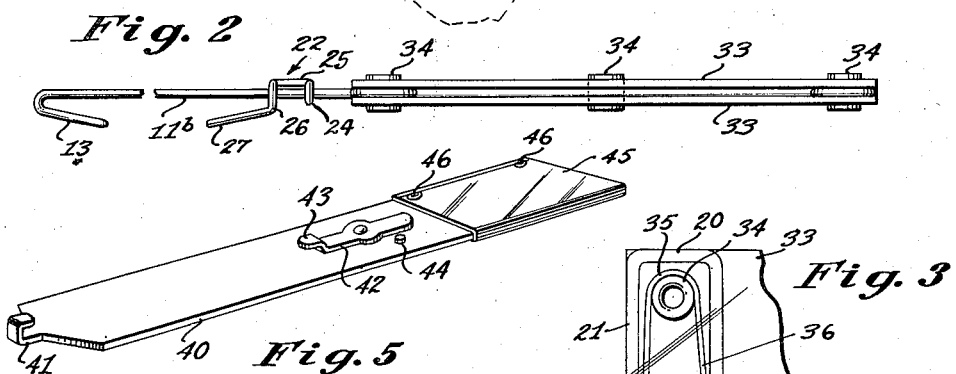
Figure 2 is a fragmentary elevational side view of the indexing device illustrated in Figure 1 and shown in a bigger scale.
Figure 3 is a fragmentary top plan view of the indexing device shown in Figure 1 detailing the arrangement of the spring-biased slide.
Figure 5 is a perspective view of a modified form of the indexing device according to my invention.
Figure 6:
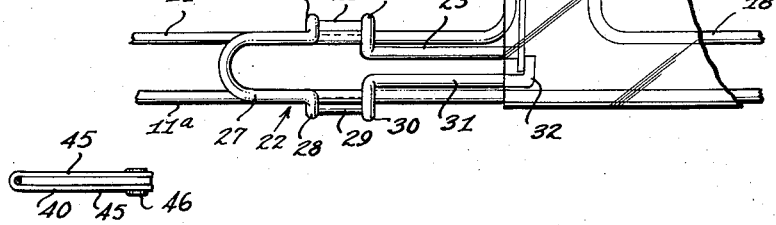
Figure 6 is an end view of the indexing device shown in Figure 5.
Figure 4:
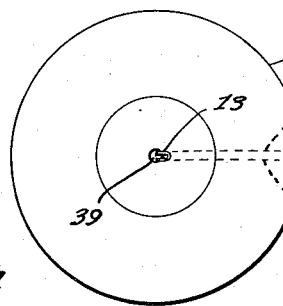
Figure 4 is a top plan view of an indexing device according to my invention attached to a phonograph record shown in a reduced scale.

In Figures 5 and 6, a modification of the index device according to my invention is illustrated. This modification comprises a frame 40 shaped like a thin flat elongated bar or plate and made from any suitable material, such as metal, paper, plastic, or the like. On one end of this frame 40 a hook 41 is formed adapted to engage the center hole 39 of the record 38.

As a distance from this hook a latch 42 made from metal or plastic is rotatably mounted on the frame and has a finger-like portion 43 located in the same plane as the hook 41. A stop 44 is provided on the frame adapted to prevent the latch 42 from executing a full 360° rotary movement.

On the end of the frame 40 opposite the hook 41 two window panes 45 are fastened to the frame 40 by means of hollow rivets 46. The window panes are preferably made from transparent plastic material.

This modified form of my indexing device can be removably attached to a record by adjusting the latch 42 to extend transversely of the frame, inserting the hook 41 into the center hole of a record and positioning the latch so that the latch finger 43 extends over the record.

Having described my invention, I claim as new and desire to secure by Letters Patent:

1. An indexing device for a phonograph record disc including a center hole and a marginal edge, comprising an elongated frame including inner and outer ends, a hook on said inner end of said frame insertable in said center hole, a latch carried by said frame in longitudinally-spaced relation to said hook, said latch including a latch finger, means pivotally mounting said latch on said frame for pivotal adjusting movement thereon to project said finger into overlying relation to said marginal edge whereby to cooperate with said hook to support said frame on said disc radially thereof, said outer end of said frame extending radially outwardly of said marginal edge and being formed with means adapted to mount indexing means thereon.

2. An indexing device for a phonograph record having a central opening and marginal edge, the device comprising an elongated arm disposed adjacent to one side of the record and extending radially of the record, a hook secured to the inner end of the arm and engageable in the central opening of the record, movable latch means connected with the arm near the marginal edge of the record and including a part which is offset laterally with respect to the arm for engagement over the marginal edge of the record for holding the record between the arm and said part, the arm extending radially beyond the marginal edge of the record and latch means for a substantial distance, and record-indexing means secured to the arm radially outwardly of the marginal edge of the record and latch means.

3. An indexing device for a phonograph record having a central opening and marginal edge, said device comprising an elongated arm disposed adjacent to one side of the record and extending radially of the record, a hook secured to the inner end of the arm for engagement within the central openings of the record, the arm extending radially beyond the marginal edge of the record for a substantial distance, record-indexing means secured to the arm radially beyond the marginal edge of the record, and a latch element longitudinally slidably mounted upon the radial arm radially inwardly of said record-indexing means and including an extension which is offset laterally with respect to the arm so that the marginal edge of the record may engage between the arm and offset extension.

4. An indexing device for a phonograph record having a central opening and marginal edge, said device comprising an elongated substantially straight arm arranged adjacent to one side of the record and extending radially of the record, a hook secured to the inner end of the arm and engaging within the central opening of the record, the arm extending radially beyond the marginal edge of the record for a substantial distance, record-indexing means mounted upon the arm radially beyond the marginal edge of the record, a latch element longitudinally slidably mounted upon the arm radially inwardly of said record-indexing means and including a portion which is offset laterally with respect to the arm so that the marginal edge of the record may engage between the arm and said offset portion, and a spring connected with the arm and latch element and serving to urge the latch element radially inwardly toward the marginal edge of the record.

5. An indexing device for a phonograph record having a central opening and marginal edge, said device comprising an elongated substantially flat plate arranged adjacent to one side of the record and extending radially thereof, a hook integrally secured to the inner end of the plate and engaging within the central opening of the record, the plate extending radially beyond the marginal edge of the record for a substantial distance, record-indexing means mounted upon the plate radially beyond the marginal edge of the record, and a latch element pivotally mounted upon one side of the plate and spaced radially outwardly of the hook and radially inwardly of said indexing means, the latch element including an extension which is offset laterally with respect to the arm so that the marginal edge of the record may engage between the arm and laterally offset extension.

6. An indexing device for a phonograph record having a central opening and marginal edge, said device comprising an elongated substantially flat plate arranged adjacent to one side of the record and extending radially of the record, a hook secured to the inner end of the plate and engaging within the central opening of the record, the plate extending radially beyond the marginal edge of the record for a substantial distance, a transparent sheet mounted upon one side of the plate radially outwardly of the marginal edge of the record so that record-indexing material may be inserted between the plate and transparent sheet, and a latch element pivotally mounted upon the plate near and radially inwardly of the transparent sheet and including an extension which is offset laterally with respect to the plate so that the marginal edge of the record may engage between the plate and extension.

JOHN E. McCOMBIE.

REFERENCES CITED

The following references are of record in the file of this patent:

UNITED STATES PATENTS

| Number | Name | Date |
|---|---|---|
| 1,399,757 | Emerison | Dec. 13, 1921 |
| 1,423,655 | Erickson | July 25, 1922 |
| 1,475,025 | Newman et al. | Nov. 20, 1923 |
| 1,489,147 | Padgett | Apr. 1, 1924 |
| 1,712,423 | Devins | May 7, 1929 |
| 1,860,380 | Borregard | May 31, 1932 |
| 2,149,796 | Smith | Mar. 7, 1939 |

FOREIGN PATENTS

| Number | Country | Date |
|---|---|---|
| 697,604 | France | Jan. 20, 1931 |